Aug. 4, 1931.   W. B. LASKEY   1,817,383
METHOD OF AND MACHINE FOR PRODUCING CONFECTIONS
Filed March 27, 1929   6 Sheets-Sheet 3
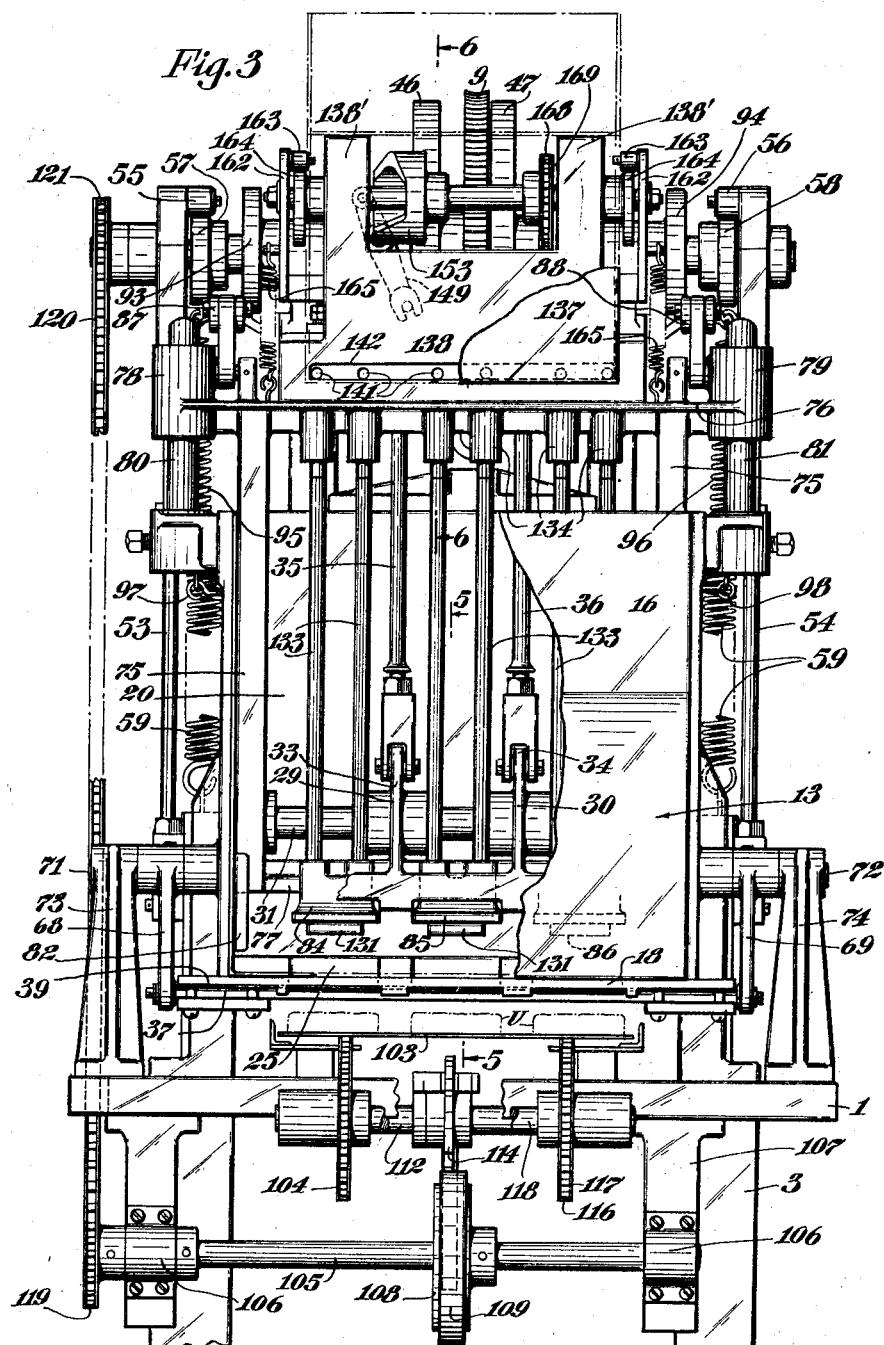
Fig.3
Fig.9
INVENTOR
William B. Laskey, deceased
Rose Dagnais Laskey, Executrix
by Gustav Drews
ATTORNEY

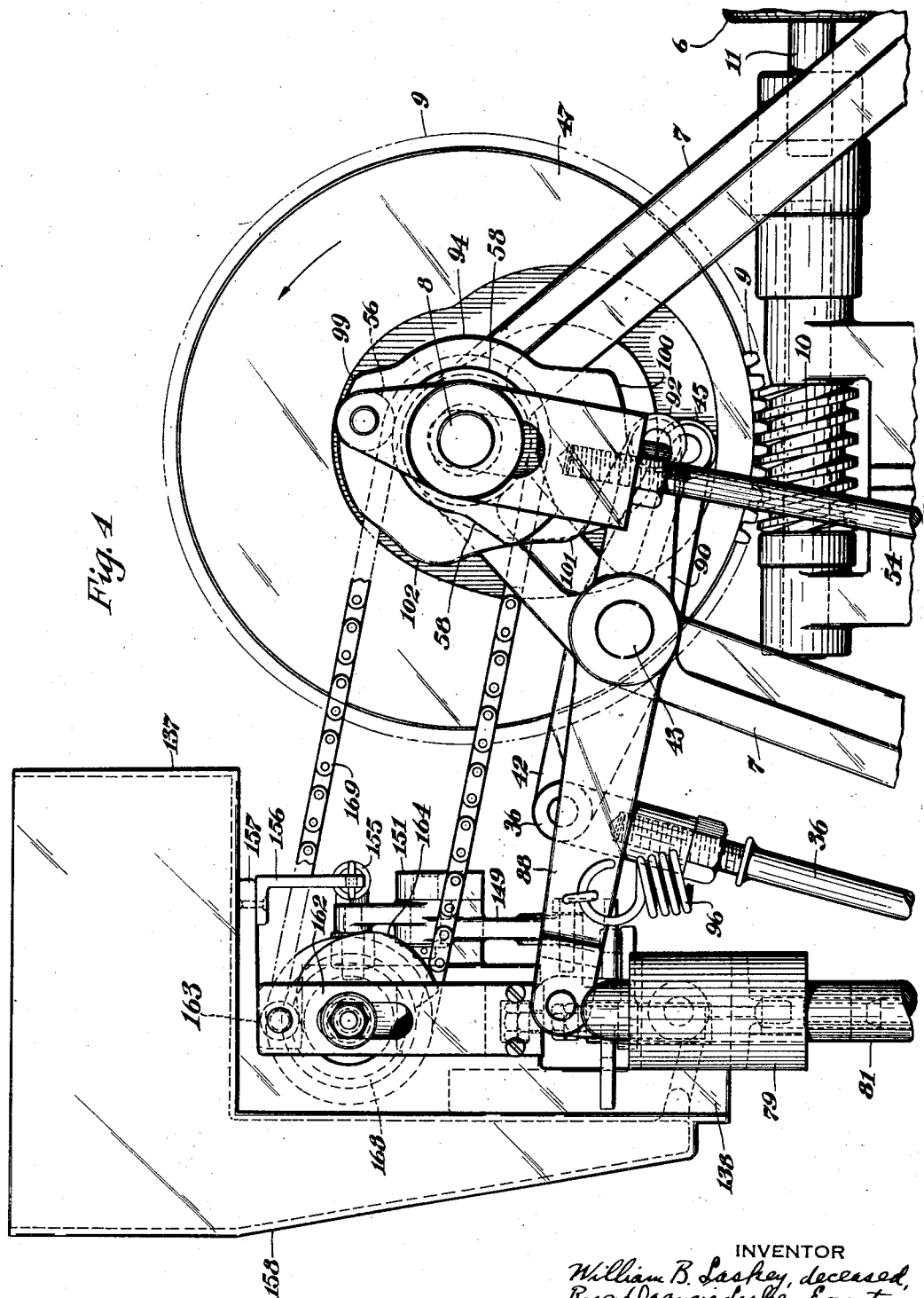

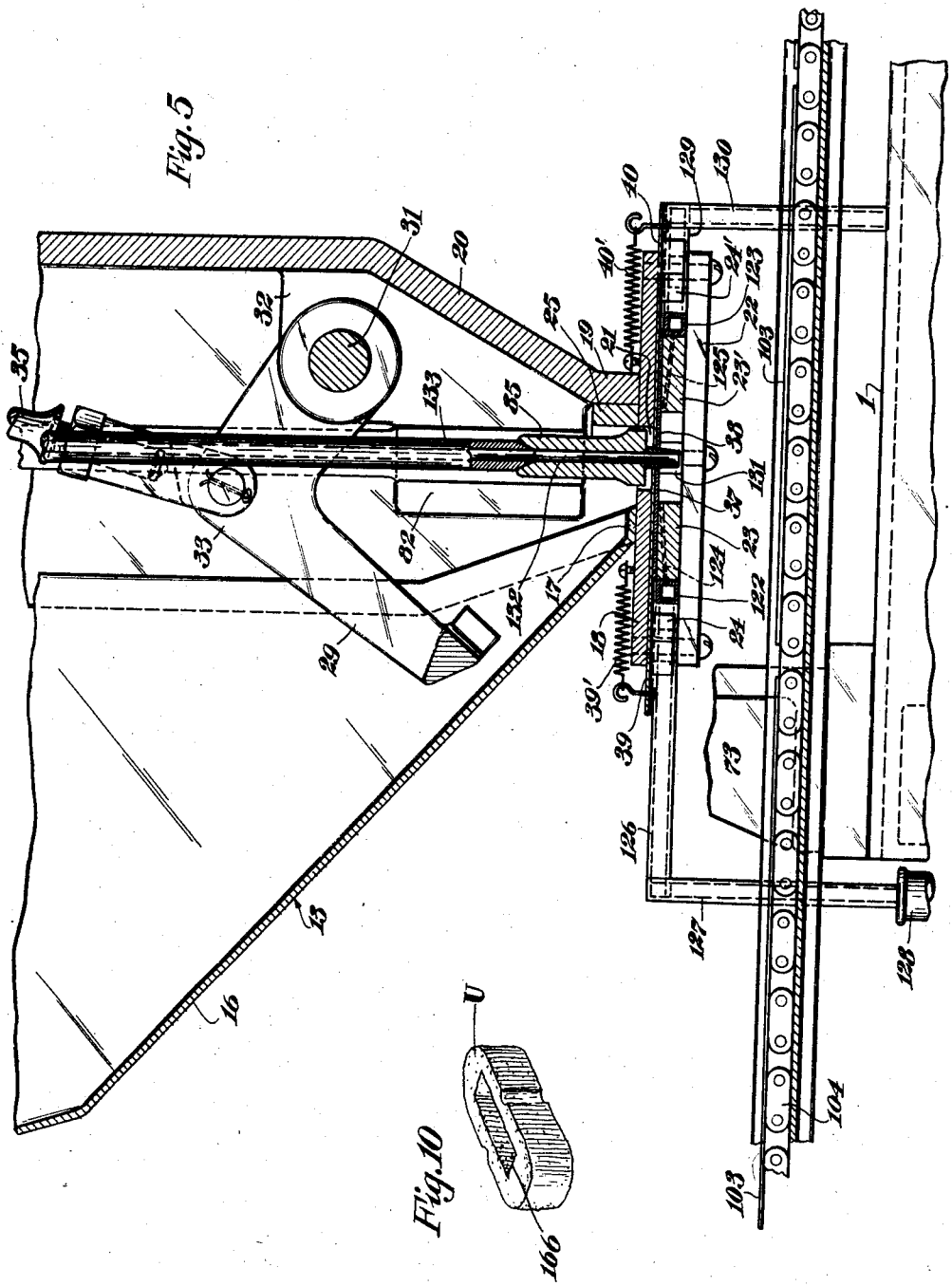

Aug. 4, 1931.  W. B. LASKEY  1,817,383
METHOD OF AND MACHINE FOR PRODUCING CONFECTIONS
Filed March 27, 1929  6 Sheets-Sheet 6
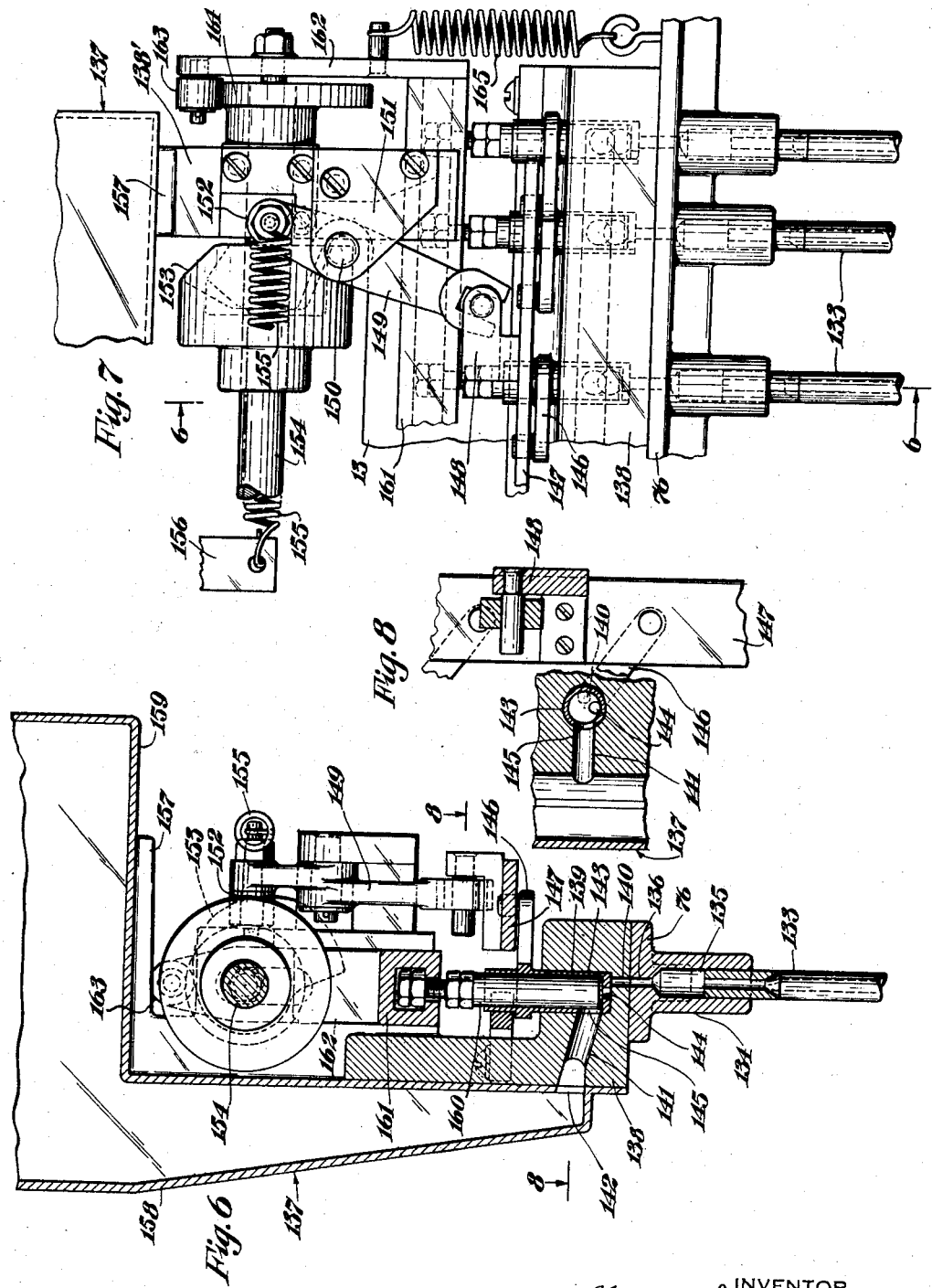
INVENTOR
William B. Laskey, deceased,
Rose Dagnais Laskey, Executrix,
by Gustav Drew
ATTORNEY Patented Aug. 4, 1931

1,817,383

UNITED STATES PATENT OFFICE

WILLIAM B. LASKEY, DECEASED, LATE OF BROOKLYN, NEW YORK, BY ROSE DAGNAIS LASKEY, EXECUTRIX, OF BROOKLYN, NEW YORK, ASSIGNOR TO MASON, AU & MAGENHEIMER CONFECTIONERY MANUFACTURING COMPANY, OF BROOKLYN, NEW YORK, A CORPORATION OF WEST VIRGINIA

METHOD OF AND MACHINE FOR PRODUCING CONFECTIONS

Application filed March 27, 1929. Serial No. 350,173.

This invention relates to methods of, and machines for, producing confections in general, and more especially to methods of, and machines for, producing confections composed of two distinct candy compositions.

Among the main objects of the present invention, it is aimed to provide a method of, and machine for, producing candy centers or units, each comprising a main body composed of a plastic mass such as a cocoanut and cream mixture, and associated therewith or formed therein, a portion of another character of candy composed, for instance, of a semi-solid substance such as jelly or the like.

More specifically, it is another object of the present invention to provide an improved method of, and machine for, producing candy centers or units, each composed of two distinct candy compositions, according to which the form or shape of the plastic portion of the unit can be accurately determined, the location for the jelly portion of the candy center produced, and the jelly portion accurately determined and accurately positioned in such location.

Specifically, the invention still further contemplates an improved method of, and machine for, producing candy centers or units composed of a plurality of distinct candy mixtures comprising, for instance, a main body portion of a plastic mass consisting of a cocoanut cream mixture and associated therewith a portion of another mixture such, for instance, as jelly or the like, according to which, units of the plastic mass are first segregated while forming the lateral sides and bottom thereof, thereupon the location for the jelly portion produced while extruding such segregated unit, thereupon forming the upper surface of the unit, and positioning the jelly portion in its relation to the plastic mass.

These and other features, capabilities and advantages of the invention will appear from the subjoined detail description of the method of, and one specific embodiment of the machine for, carrying out such method, which embodiment is illustrated in the accompanying drawings, in which Figure 1 is a side elevation of a machine made according to the present invention;

Fig. 3 is a fragmental end elevation looking at the left hand end of Fig. 1;

Fig. 4 is an enlarged side elevation of the upper portion of the machine;

Fig. 5 is an enlarged fragmental, longitudinal section on the line 5—5 of Fig. 3;

Fig. 6 is an enlarged fragmental, longitudinal section on the line 6—6 of Fig. 3;

Fig. 7 is an enlarged fragmental section showing the mechanism for controlling the supply of one of the candy mixtures;

Fig. 8 is a fragmental enlarged detail, partly in section, of the controlling mechanism illustrated in Fig. 7;

Fig. 9 is a fragmental plan of the die plate forming the discharge openings; and Fig. 10 is a perspective of a candy center formed according to the present invention.

Figure 1:
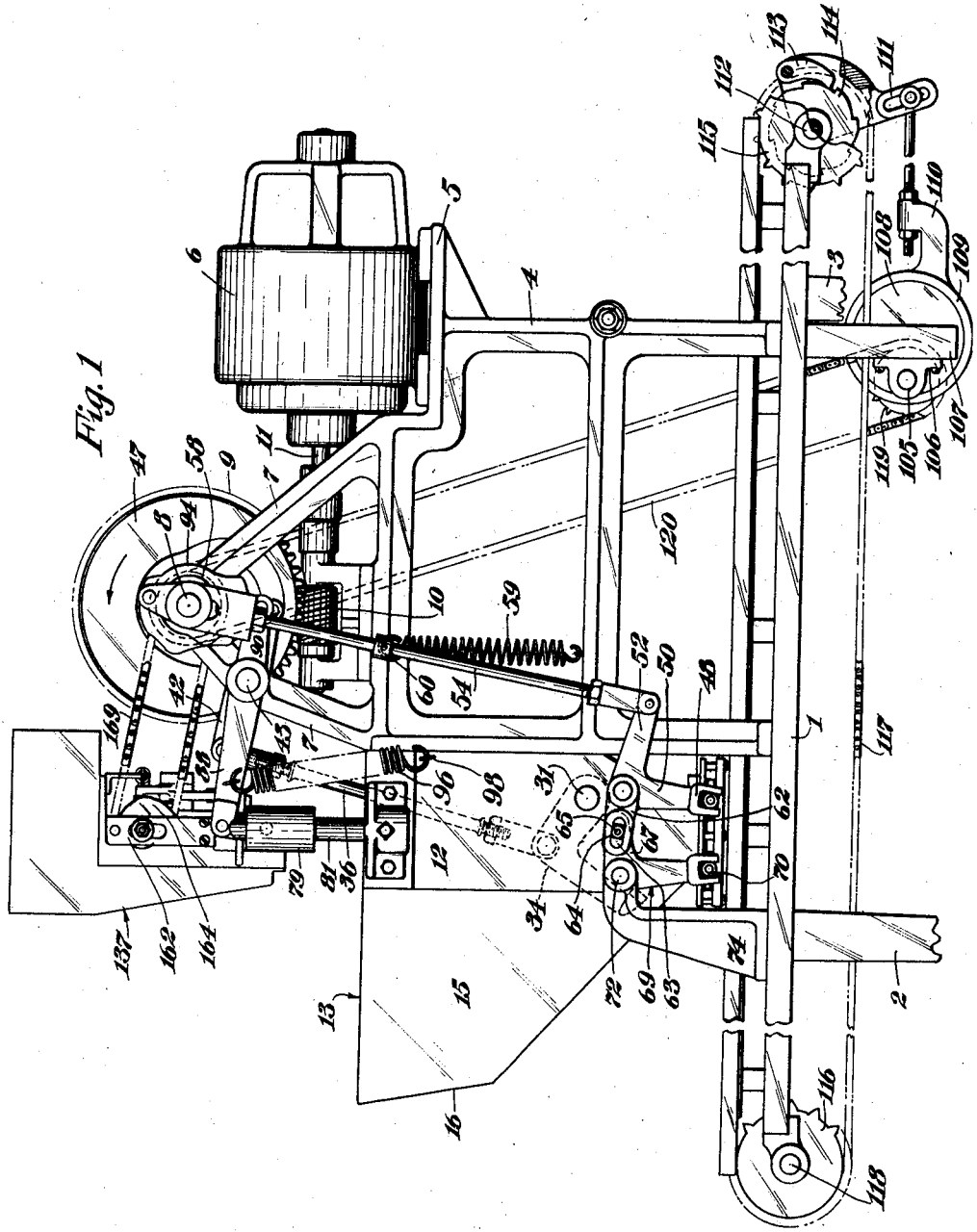

In the embodiment illustrated, there is provided a frame 1 supported on standards 2, 3. On the frame 1, there is provided a bracket 4 having a platform 5 for a motor 6. The bracket 4 has upwardly extending portions 7, forming at their upper ends a journal for the shaft 8 which may be considered the main drive shaft for the several mechanisms hereinafter to be described since all of them are in one way or another connected with it.

On the shaft 8, there is formed a worm wheel 9 which meshes with the worm 10 connected to the shaft 11 of the motor 6.

To one end of the bracket 4, which may be considered the front end of the machine, there is secured a second bracket member 12 to which is operatively connected the hopper or trough 13 for the candy mixture to be formed into the main body portion of the candy centers or units. This trough 13 is open at its upper end and has vertical side walls 14, 15, and an angular front wall 16 inclining rearwardly in a downward direction and terminating in a flange 17 secured to the base or die plate 18. The base plate 18 is also connected to the lower end 19 of the rear wall member 20 of the bracket or wall portion 12, and thus is suspended thereby. The base plate 18 is provided with a plurality of discharge openings 21, in the present instance, three in number, see Fig. 9. Below the base plate 18, spaced therefrom and connected thereto, there is formed a supporting bracket or plate 22 on which are slidably supported the cross bars 23, 24, and 24′, 23′.

In the trough or hopper 13, units of the mixture are initially selected, and the lateral sides and bottoms thereof formed. To this end, a stationary die plate 25 is secured adjacent to the lower end 19 of the wall 20 for forming one of the lateral faces of a plurality of units, in the present instance, three candy centers or units, which faces register with one row of edges of the openings 21. To form the other row of lateral faces for the three candy units to be discharged through the openings 21, the die blades 26, 27 and 28 are provided, which are connected by the arms 29 and 30 to the shaft 31 journaled in the bearing 32 extending from the wall 20.

The arms 29 and 30 are bent levers to the elbows 33, 34, to which are connected the links 35 and 36. The die faces of the blades 26, 27 and 28 register with the die faces of the stationary die plate 25 when the blades 26, 27 and 28 are in their lowermost position and likewise register with the front edges of the openings 21, thereby the die faces of the stationary die plate 25 and the die faces of the movable die blades 26, 27 and 28 will form upwardly continuing walls for the discharge openings 21.

In the operation of these die blades 26, 27 and 28, three candy units will be selected from the mixture in the trough 13. When these three units are so selected, one row of edges of the discharge openings 21 and the die faces of the stationary die plate 25 will define one row of lateral faces of such three units, and the other or front row of lateral edges of the discharge opening 21 and the die faces 26, 27 and 28 will define the other or front row of lateral faces of such three units.

When the three units are so selected, the cut-off knives 37 and 38, mounted on the cross bars 23 and 23′ respectively, will be in closed position at the bottom of the discharge openings 21, as shown in Fig. 5, with the opposing edges of the cut-off knives 37 and 38 substantially in engagement with one another. The knives 37 and 38 have associated therewith auxiliary closure members 39 and 40, mounted on the cross bars 24′ and 24 respectively, and are provided with springs 39′ and 40′ for yieldably causing the same to approach one another to cooperate with the knives 37 and 38 to completely shut off the passage through the openings 21, so that the units, when selected, will be properly supported on such closure members 39 and 40, preparatory to being discharged through such openings 21.

In the present instance, it will be noted that the upper surfaces of the closure members 39 and 40 slide along the lower surfaces of the die plate 18 and that the lower surfaces of the closure members 39 and 40 slide on the upper surfaces of the knives 37 and 38.

Figure 2:
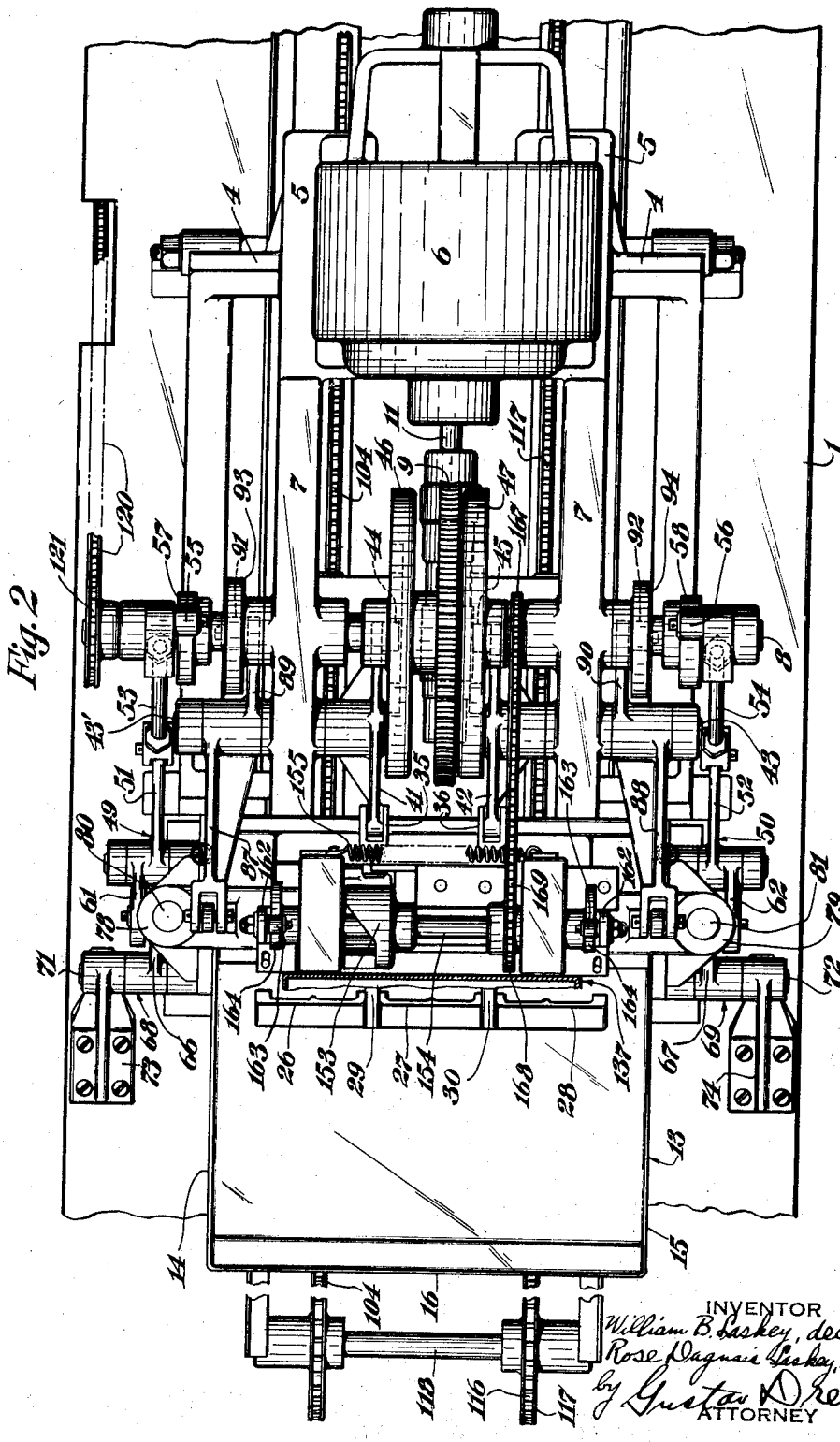
Fig. 2 is a fragmental plan, slightly enlarged, with portions thereof removed.

For operating the arms 29 and 30 to select units, the links 35 and 36 are connected to the front ends of the levers 41 and 42 pivotally mounted on the stub shafts 43 and 43′ journaled in the bracket extensions 7, see Fig. 2. The rear ends of the levers 41 and 42 are provided with cam rollers 44 and 45 traveling in the cam slots of the cams 46 and 47 respectively, fixedly mounted on the shaft 8, see Fig. 2.

The bar 23′ of the cut-off knife 38 is operatively connected to the forked ends 48 of the bent levers 49, 50, which are suitably fulcrumed at their elbows, as shown in Fig. 1. The rearwardly extending arms 51 and 52 are pivotally connected to the lower ends of the links 53 and 54 respectively, the upper ends of which are provided with cam rollers 55 and 56 respectively, held in engagement with the cams 57 and 58 respectively by means of the springs 59 which engage the collars 60 of the links 53 and 54 respectively and connect them to the frame portion 40, indicated in Fig. 1.

The bent levers 49 and 50 are provided, as particularly shown in Fig. 1, with forwardly extending arms 61 and 62 respectively, which are provided with slots 63 to receive the slide blocks 64 on the pins 65 extending outwardly from the forwardly extending arms 66 and 67 respectively of the bent levers 68 and 69 respectively. The lower ends of the bent levers 68 and 69 are bifurcated to receive the pins 70, extending from the edges of the bar 23 of the front cut-off knife 37. The bent levers 68 and 69 are pivotally connected to the pins 71 and 72 formed in the upper ends of the bearings 73 and 74 respectively.

From the foregoing it will be seen that the cut-off knives 37 and 38 will be caused to approach one another simultaneously, and that when so approaching one another, the springs 39′ and 40′ will cause the closure members 39 and 40 simultaneously to approach one another. On the other hand, when the bent levers 49 and 50 are operated to cause the cut-off knives to recede from one another, the outer ends of the bars 23 and 23′ will engage the bars 24 and 24′ simultaneously to cause the closure members to recede from one another in opposition to the tension of the springs 39′ and 40′.

Before the candy units are selected, the cut-off knives 37 and 38, and closure members 39 and 40, will be in closed position, and after the die blades 26, 27 and 28 have descended and completed the selection of three candy units, thereupon the cut-off knives 37 and 38, and closure members 39 and 40, will be caused to recede, and thereupon the ejecting means now to be described will be caused to function.

The means for ejecting the candy units consist essentially of the plunger bracket 75 having an upper cross bar 76 and a lower cross bar 77, the ends of the upper cross bar 76 having formed thereon the sleeves 78 and 79 slidably mounted on the vertical standards 80 and 81 respectively, and the lower ends of the bracket 75 being guided in the guideways 82 and 83 respectively secured to the inner walls of the trough 13. The cross bar 77 is provided with three ejecting feet 84, 85 and 86 respectively, which in lateral conformation correspond to the die openings 21 and the formation of the stationary die plate 25 and die blades 26, 27 and 28, such feet 84, 85 and 86 cooperating with the stationary die plate 25 and die blades 26, 27 and 28 to eject the units selected by these die members through the die openings 21. The sides of the sleeves 78 and 79 are pivotally connected to the levers 87 and 88 respectively which are fulcrumed on the stub shafts 43' and 43 respectively, and are provided with arms 89 and 90 respectively on the free ends of which there are formed cam rollers 91 and 92 respectively maintained in engagement with the cams 93 and 94 respectively mounted on the cam shaft 8. The cam rollers 91 and 92 are maintained in engagement with the cams 93 and 94 by the springs 95 and 96 respectively connecting the front arms of the levers 87 and 88 respectively with the abutments 97 and 98 respectively formed on the sides of the wall portion of the trough 13.

The die blades 26, 27 and 28, cut-off knives 37 and 38 with their closure members 39 and 40, and ejecting feet 84, 85 and 86, are timed relative to one another so that when the ejecting feet 84, 85 and 86 are in raised position and the die blades 26, 27 and 28 are in raised position, the cut-off knives 37 and 38 with their closure members 39 and 40 will be in closed position to form the bottom faces of the candy units to be selected. Thereupon, the die blades 26, 27 and 28 will descend to select three candy units disposed in registration with the openings 21, thereupon the cut-off knives 37 and 38 and closure members 39 and 40 will recede from one another, and thereupon the ejecting feet 84, 85 and 86 will be caused to descend to eject from the openings 21 the units U selected by the die blades 26, 27 and 28. Preferably before the ejecting feet 84, 85 and 86 are caused to eject the units, they will be given an initial rise to relieve the pressure on the units selected. This initial rise or relief is effected by means of bumps 99 formed on the cams 97 and 98 respectively.

The cams 93 and 94 are provided with a plurality of bumps such as the bumps 100, 101 and 102, the bumps 100 of these cams cooperating with the rollers 91 and 92 to initially raise the plunger bracket 75 after the ejecting operation. The bump 101 has a less radius than the bump 100 and a greater radius than the bump 102, and cooperates with the bumps 100 and 102 and the intervening depressions to cause the plunger bracket 75 to transmit a packing action on the units as they are being selected.

The present invention can be used with a single mixture of candy, in which case the units are formed and discharged as aforesaid. In such case, after the bumps 99 of the cams 93 and 94 cooperate with the levers 87 and 88 to relieve the pressure above the units selected by the die blades 26, 27 and 28, the closure members 39 and 40 and the cut-off knives 37 and 38 will be caused to recede from one another to clear the openings 21, whereupon the cams 93 and 94 will permit the springs 95 and 96 to actuate the plunger bracket 75 to descend and cause the ejecting feet 84, 85 and 86 to eject the three units U from the opening 21. Thereupon the cut-off knives 37 and 38 will immediately be caused to close to cut off the units so ejected and permit them to drop.

As the units U drop, they will preferably be received by the conveyor plates or boards 103 mounted on the conveyor chain 104, and after being so received, the conveyor chain 104 will be actuated to move a step sufficiently far to clear the path of movement of the units discharging from the openings 21 so that a clear space will be provided on the plates 103 to receive another row of units U. For actuating the conveyor chain 104 in time relation with the discharge of the units U, there is provided a shaft 105 mounted in the bracket 106 secured to the bracket 107 extending down from the frame 1.

On this shaft 105 is mounted an eccentric 108 cooperating with the ring 109 formed on the bracket 110 which is pivotally connected with the arm 111 fulcrumed on the shaft 112. The arm 111, see Fig. 1, is provided with the pawl 113 positioned to cooperate with the ratchet 114 mounted on the shaft 112. The shaft 112 is suitably mounted in the frame 1 and has fixed thereon the sprocket wheel 115 which is connected to the sprocket wheel 116 by the sprocket chain 117, the sprocket wheel 116 being mounted on the shaft 118 at the other end of the frame 1. The shaft 105 has secured thereon a sprocket wheel 119 which is connected by the sprocket chain 120 with the sprocket wheel 121 on the cam shaft 8. The eccentric 109 is so positioned on the shaft 105 relative to the cams on the cam shaft 8 so that it will actuate the arm 111 to advance the chain one step at a time after each discharge of a row of units U.

To facilitate maintaining the cutting edges of the knives 37' and 38 as well as the closure members 39 and 40 clear of candy particles which might normally adhere thereto, it has been found preferable to maintain a stream of steam directed to such cutting edges. For this purpose, the rear ends of the bars 23 and 23' are provided with conduits 122 and 123 respectively which are connected by a plurality of steam conduits 124 and 125 extending through the bars 23 and 23' in an upward direction toward the cutting edges of the cutoff knives 37 and 38 and free ends of the closure members 39 and 40. The conduit 122, as indicated in Fig. 5, is connected to the conduit 126 which is connected by the conduit 127 to a conduit 128 which is connected to a source of steam supply. The conduit 123 in turn is connected to the conduit 129 which is connected to the conduit 130 which is similarly connected to a source of steam supply.

When the present invention is intended for use with two mixtures of candy, then the ejecting feet 84, 85 and 86 respectively are preferably provided with ejecting nozzles. In the present instance, these ejecting nozzles are formed in the blocks 131 extending from the lower surfaces of the ejecting feet 84, 85 and 86. The ejecting blocks 131 of the ejecting feet 84, 85 and 86 communicate with the conduits 132 which extend through the ejecting feet 84, 85 and 86 and communicate with the tubes 133. There are provided two tubes 133 for each ejecting foot 84, 85 and 86. The tubes 133 are all connected at their upper ends with the extensions 134 extending from the cross bar 76. The extensions 134 are provided with conduits 135 forming communications between the tubes 133 and the openings 136 in the cross bar 76.

On the cross bar 76, there is mounted the trough 137 for the second mixture and the mechanism for feeding such second mixture from such trough 137 to the openings 136 in the cross bar 76, which mechanism in relation to the trough 137 will now be described.

On the cross bar 76 there is mounted a bracket 138 which is provided with a plurality, in the present instance six in number, of large openings 139, communicating by means of the small openings 140, see Fig. 6, with the openings 136 in the cross bar 76. The bracket 138 is also provided with a plurality of inclined openings 141 in communication with the large openings 139. The inclined openings 141 are positioned to communicate with the openings 142 formed at the lower end of the trough 137. In the large openings 139 there are provided a plurality of sleeves or cylinders 143 which are provided with small openings 144 in their bottoms and lateral openings 145 in their lower sides, the openings 144 being positioned to register with the openings 140 when the openings 141 are shut off from communicating with the interior of the cylinders 143, and the openings 145 are similarly positioned with respect to the openings 144 so that they will establish communication between the interior of the cylinders 143 and the openings 141 when the openings 140 are shut off from communication with the interior of the cylinders 143.

For actuating the cylinders 143 alternately to establish communication with the openings 144 and 145, one set exclusive of the other, there are provided a plurality of levers 146, one fixed to each cylinder 143, and pivotally connected at its outer end to the slide bar 147 which has secured thereto a bracket 148 pivotally connected to the lower end of the lever 149 fulcrumed at 150 to the bracket 151 secured to the main bracket 138. The upper end of the lever 149 has formed thereon a cam roller 152 which is held in engagement with the barrel cam 153 mounted on the shaft 154 by means of the spring 155 connecting it with the abutment 156 extending from the extension 157 of the bracket 138. The shaft 154 is mounted in the journals formed in the arms 138', 138', of the bracket 138, see Fig. 7.

As clearly shown in Fig. 6, the trough 137 has an elongated downward extension 158 which is secured to the side of the bracket 138 while the main bottom 159 rests on the extension 157 of the bracket 138.

In the cylinders 143, the pistons 160 are slidably mounted, being connected at their upper ends to the cross bar 161 which is connected to the extensions 162. To the upper ends of the extensions 162 there are provided the cam rollers 163 which are held in engagement with the cams 164 mounted on the shaft 154. For maintaining the cam rollers 163 in engagement with the cams 164, the springs 165 are provided which are connected to the extensions 162 at their upper ends and at their lower ends to the cross bar 76.

When the machine is provided with the means for supplying the second mixture of candy just referred to, the several operative mechanisms are so timed as illustrated so that after the conveyor 104 has come to rest and the closure members 39 and 40 have shut off the openings 21, the die blades 26, 27 and 28 will be caused to descend to select three units U. Thereupon the plunger element or bracket 75 will be caused to be raised to relieve the pressure above the unit selected by means of the bump 99. Thereupon the knives 37 and 38 will be caused to recede from one another at the same time causing the closure members 39 and 40 to recede from one another. Thereupon the plunger bracket 75 will be caused to descend its full distance to eject the units U through the openings 21, so cleared by the closure members 39, 40, and knives 37, 38, the blocks or discharging nozzles 131 at the lower ends of the ejecting feet 84, 85 and 86 having in the meantime formed recesses 166, see Fig. 10, in the units U. Thereupon while the cut-off knives 37, 38, and closure members 39, 40, approach one another to engage the blocks 131, the plungers 160 will have been caused to descend and urge the jelly or other second candy mixture in the cylinders 143 to pass through the tubes 133 and blocks 131 into the recesses 166 formed in the units U. Thereupon the plunger bracket 75 will be caused to complete its ascent and the closure members 39, 40, caused to completely shut off the openings 21. Preferably at the same time the cylinders 143 will be rocked so that their lateral openings 145 communicate with the openings 141 and 142, and the lower openings 144 are moved out of communication with the openings 140, and thereupon, the plungers 160 caused to rise so that due to the suction created when rising a fresh supply of jelly or other second candy mixture will be fed or advanced into the cylinders 143. As soon as the plungers have completed their ascent, the cylinders 143 will be turned to shut off communication between the cylinders and the openings 141 and 142 and to establish communication between the cylinders 143 and the openings 140 through the openings 144 to be prepared to permit its contents to be discharged upon the next descent of the plungers 160.

In order to facilitate operating the shaft 154 and appurtenant parts in timed relation with the shaft 8 and appurtenant parts, these two shafts are connected with one another, the shaft 8 having mounted thereon the sprocket wheel 167 which is connected with the sprocket wheel 168 fixed on the shaft 154 by the sprocket chain 169.

It is obvious that various changes and modifications may be made to the details of construction of the embodiment illustrated and in the steps of the method for carrying out the invention, without departing from the general spirit of the invention as set forth in the appended claims.

What is claimed is:

1. The method of forming a candy center consisting in exercising a force in one direction to select a unit from a mass of plastic material contained in a tank, and initially forming the sides of said unit, exercising a force in another direction progressively to pack the unit while the same is being selected, extruding the unit, and forming the upper surface of the unit while the same is being extruded.

2. The method of forming a candy center consisting in selecting a unit from a mass of plastic material in a lateral direction, progressively packing the unit as it is being selected in a downward direction, and extruding the unit.

3. The method of forming a candy center consisting in selecting a unit from a candy mass in a trough, simultaneously extruding the unit selected from the bottom of said trough into a suspended position and at the same time forming a recess in the unit, thereupon pouring a mass of another candy mixture in said recess, and causing the units so selected to be released.

4. The method of forming a candy center consisting in selecting a unit from a candy mass in a trough, simultaneously extruding the unit selected from the bottom of said trough into a suspended position and at the same time forming a recess in the unit, thereupon pouring a mass of another candy mixture in said recess, and cutting off the unit so selected.

5. The combination with a trough containing a mass of a candy mixture and having a die plate, of a plunger for extruding a unit of candy from said mass through the die plate into suspended position, a projection at the end of said plunger to form a recess in the unit as it is being extruded, and means for pouring a predetermined amount of a second mixture of candy in the recess so formed.

6. The combination with a trough for a mass of one candy mixture and a die plate, of a plunger for extruding a unit of candy from said mass through said die plate, a projection on the end of said plunger for forming a recess in the unit while being extruded, a reservoir containing a second mixture of candy, a conduit extending from said reservoir to said projection, means for causing a predetermined amount of the second mixture of candy to pass from said reservoir through said conduit and projection into said recess, and means for causing the unit thereupon to be released.

7. The combination with a trough having a mass of one candy mixture and a plate having a plurality of openings, means for expelling a plurality of units of candy from said mass through said openings, projections associated with said expelling means for forming recesses in the units, and means associated with said expelling means for extruding a second mixture of candy into said recesses.

8. The combination with a die plate, of means for extruding a unit of candy through said die plate, and means for causing said extruding means progressively to pack the unit before it is extruded.

9. The combination with a trough for a mass of one mixture of candy and a die plate, of a plunger for extruding a unit of candy from said mass through said die plate, a projection associated with said plunger for forming a recess in the unit extruded, and means for extruding a second mixture of candy into said recess.

10. The combination with a container, of a plunger for extruding a unit of candy from the bottom of said container, a conveyor extending along the bottom of said container, cut-off means for cutting off the unit as it is extruded to permit it to drop on to said conveyor, levers pivotally connected to said cut-off means and fulcrumed above said cut-off means and means for actuating said levers.

11. The combination with a container having a plurality of die openings in the bottom thereof, means for registering a plurality of units of candy above said openings, cut-off knives for closing said openings, means for causing said cut-off knives to open preparatory to extruding the units, a plurality of plungers for extruding the units when said cut-off knives are open, a pair of bent levers having downwardly extending arms operatively connected to one of said knives, a second pair of bent levers having downwardly extending arms operatively connected with the other of said knives, and means for actuating one pair of said levers, said levers being operatively connected to one another whereby said knives may simultaneously recede and approach one another.

12. The combination with a container having a plurality of die openings in the bottom thereof, of a plurality of plungers for extruding the plurality of units through said die openings, two cut-off knives, a pair of levers having downwardly extending arms operatively connected with one of said knives, a second pair of levers having downwardly extending arms operatively connected with the other of said knives, and means for actuating one pair of levers, said first pair of levers being operatively connected with said second pair of levers to permit said cut-off knives simultaneously to approach one another to obstruct said openings and simultaneously to recede from one another to clear said openings preparatory to extruding the units.

13. The combination with a container having a die opening in the bottom thereof, of means for registering a unit of one mixture of candy in said container with said opening, a plunger for extruding said unit through said opening, a second container for a second mixture of candy mounted to reciprocate with said plunger, a conduit extending from said second container through said plunger, and means for causing a predetermined amount of candy mixture in said second container to be extruded onto the unit while the unit is being extruded.

14. The combination with a container for one mixture of candy and having a plurality of die openings, of supports adjacent to said openings means for registering a plurality of units from the mixture of candy in said container with said openings on said supports, means for withdrawing said supports, a plunger element for extruding the units through said openings after said supports have been withdrawn, a second container for a second mixture of candy, and means for causing predetermined amounts of the mixture in said second container to be extruded onto the units while they are being extruded.

15. The combination with a container for one mixture of candy and having a plurality of die openings, of means for registering a plurality of units from the mixture of candy in said container with said openings, a plunger element for extruding the units through said openings, a second container for a second mixture of candy, and conduits mounted on said plunger element and operatively connected to said second container to extrude predetermined amounts of the mixture in said second container onto the candy units as they are being extruded from said first container.

16. The combination with a container for one mixture of candy and having a plurality of die openings, of means for registering a plurality of units from the mixture of candy in said container with said openings, a plunger element for extruding the units through said openings, a second container for a second mixture of candy mounted on said plunger element, and conduits operatively connected to said second container for extruding predetermined amounts of the mixture in said second container onto the units as they are extruded by said plunger element.

17. The combination with a container for one mixture of candy and having a plurality of die openings, gathering arms for selecting a plurality of units from the mixture in said container and registering the same with said openings, a plunger element for extruding the units selected through said openings, a container for a second mixture of candy, discharge nozzles formed in said plunger element, conduits extending from said second container to said discharge nozzles, valves for shutting off communication from said second container to said conduits, plungers associated with said conduits, and means for actuating said plungers to cause predetermined amounts of the mixture to be drawn into said conduits when said valves are open and for extruding the mixture so received onto the units when said valves are closed.

18. The combination with a container for one mixture of candy having a plurality of discharge openings, of a plunger element for discharging units through said discharge openings, discharge nozzles at the end of said plunger element for forming recesses in the units as they are being discharged, means for discharging a second mixture through said discharge nozzles into the recesses formed in the units being discharged, and cut-off knives for cutting off the units as they are being discharged, there being recesses in said cut-off knives to clear the discharge nozzles.

19. The combination with a container for one mixture of candy having a plurality of discharge openings, of a plunger element for discharging units through said discharge openings, discharge nozzles at the end of said plunger element for forming recesses in the units as they are being discharged, means for discharging a second mixture through said discharge nozzle into the recesses formed in the units being discharged, cut-off knives for cutting off the units as they are being discharged, there being recesses in said cut-off knives to clear the discharge nozzles, and means for actuating said cut-off knives to approach one another into closed position after a unit has been extruded and to recede from one another before a unit is to be extruded.

20. The combination with a container for one mixture of candy having a plurality of discharge openings, of a plunger element for discharging units through said discharge openings, discharge nozzles at the end of said plunger element for forming recesses in the units as they are being discharged, means for discharging a second mixture through said discharge nozzles into the recesses formed in the units being discharged, cut-off knives for cutting off the units as they are being discharged, there being recesses in said cut-off knives to clear the discharge nozzles, means for actuating said cut-off knives to approach one another into closed position after a unit has been extruded and to recede from one another before a unit is to be extruded, and closure members cooperating with said cut-off knives completely to close the openings in said container after said discharge nozzles have been withdrawn into said container.

21. The combination with a container for one mixture of candy having a plurality of discharge openings, of a plunger element for discharging units through said discharge openings, discharge nozzles at the end of said plunger element for forming recesses in the units as they are being discharged, means for discharging a second mixture through said discharge nozzles into the recesses formed in the units being discharged, cut-off knives for cutting off the units as they are being discharged, there being recesses in said cut-off knives to clear the discharge nozzles, and closure members cooperating with said cut-off knives completely to close the openings in said container after said discharge nozzles have been withdrawn into said container.

22. The combination with a container for one mixture of candy having a plurality of discharge openings, of a plunger element for discharging units through said discharge openings, discharge nozzles at the end of said plunger element for forming recesses in the units as they are being discharged, means for discharging a second mixture through said discharge nozzles into the recesses formed in the units being discharged, cut-off knives for cutting off the units as they are being discharged, there being recesses in said cut-off knives to clear the discharge nozzles, means for actuating said cut-off knives to approach one another into closed position after a unit has been extruded and to recede from one another before a unit is to be extruded, closure members cooperating with said cut-off knives completely to close the openings in said container after said discharge nozzles have been withdrawn into said container, springs connecting said closure members with said cut-off knives to close said closure members, when off knives to close said closure members, when said discharge nozzles have been withdrawn, and abutments on said closure members cooperating with said cut-off knives to cause said closure members to recede from one another when said cut-off knives recede from one another.

ROSE DAGNAIS LASKEY,
*Executrix of the Estate of William B. Laskey, Deceased.*